(12) United States Patent
Utaka

(10) Patent No.: US 8,225,484 B2
(45) Date of Patent: Jul. 24, 2012

(54) METHOD OF MANUFACTURING STATOR FOR ELECTRIC ROTATING MACHINE

(75) Inventor: Ryosuke Utaka, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/076,986

(22) Filed: Mar. 31, 2011

(65) Prior Publication Data

US 2011/0239442 A1  Oct. 6, 2011

(30) Foreign Application Priority Data

Mar. 31, 2010 (JP) ................................ 2010-082936

(51) Int. Cl.
*H02K 15/00* (2006.01)

(52) U.S. Cl. ............... 29/596; 29/605; 29/598; 29/732; 310/201

(58) Field of Classification Search ............ 29/596–598, 29/732–736, 840, 844; 310/154.01, 156.01, 310/184, 201, 208; 219/125.11
See application file for complete search history.

(56) References Cited

U.S. PATENT DOCUMENTS

| | | | | |
|---|---|---|---|---|
| 5,845,389 A | * | 12/1998 | Roberts et al. | 29/596 |
| 6,710,501 B1 | * | 3/2004 | Kusumoto et al. | 310/254.1 |
| 6,971,153 B2 | * | 12/2005 | Tokizawa et al. | 29/596 |
| 6,990,724 B2 | * | 1/2006 | Tamura et al. | 29/596 |
| 7,287,311 B2 | * | 10/2007 | Ichikawa et al. | 29/596 |
| 2011/0012450 A1 | | 1/2011 | Umeda et al. | |

FOREIGN PATENT DOCUMENTS

JP  2001-145286  5/2001

OTHER PUBLICATIONS

Utaka, U.S. Appl. No. 13/076,966, filed Mar. 31, 2011.
Utaka et al, U.S. Appl. No. 13/077,007, filed Mar. 31, 2011.

* cited by examiner

*Primary Examiner* — Minh Trinh
(74) *Attorney, Agent, or Firm* — Nixon & Vanderhye PC

(57) ABSTRACT

A method of manufacturing a stator includes: (a) preparing a stator core and electric wires; (b) assembling together the stator core and the electric wires; (c) welding corresponding pairs of the electric wires to form a stator coil, wherein for each corresponding pair of the electric wires, end portions of the electric wires are radially bent toward each other to have distal end surfaces thereof abutting each other at a position axially outside an annular coil end part of the stator coil, the distal end surfaces are welded together to form a weld between the end portions, and the end portions together make up a crossover part that extends to cross over the coil end part; and (d) deforming, for each corresponding pair of the electric wires, the end portions so as to reduce an axial distance between the coil end part and the crossover part.

9 Claims, 4 Drawing Sheets

METHOD OF MANUFACTURING STATOR FOR ELECTRIC ROTATING MACHINE

CROSS-REFERENCE TO RELATED APPLICATION

This application is based on and claims priority from Japanese Patent Application No. 2010-82936, filed on Mar. 31, 2010, the content of which is hereby incorporated by reference in its entirety into this application.

BACKGROUND

1. Technical Field

The present invention relates to methods of manufacturing stators for electric rotating machines that are used in, for example, motor vehicles as electric motors and electric generators.

2. Description of Related Art

Conventionally, there are known stators for electric rotating machines which include a hollow cylindrical stator core and a stator coil. The stator core has a plurality of slots that are formed in the radially inner surface of the stator core and spaced in the circumferential direction of the stator core. The stator coil is comprised of a plurality of electric wires mounted on the stator core.

Moreover, there is disclosed, for example in Japanese Patent Application Publication No. 2001-145286, a method of manufacturing a stator. According to the method, to improve the space factors of the electric wires in the slots of the stator core, each of the wires of the U-phase, V-phase, and W-phase windings of the stator coil is configured to have a rectangular cross section and have such an overall shape that when developed on a plane, the winding meanders in the form of cranks. Further, each of the U-phase, V-phase, and W-phase windings is wound by a predetermined number of turns into a spiral shape, so as to make the stator coil have a hollow cylindrical shape.

With the above method, however, each of the electric wires (or electric conductors) that respectively make up the U-phase, V-phase, and W-phase windings of the stator coil is required to have a long length. Accordingly, a large-scale shaping machine is needed for shaping the electric wires. Moreover, since each of the electric wires is long, it is difficult to handle the electric wires during the manufacture of the stator. As a result, it is difficult to secure a high productivity and a low cost of the stator.

To solve the above problems, the assignee of the present application (i.e., Denso Corporation) has developed a stator 20 as shown in FIG. 1. It should be noted that for the stator 20, the assignee of the present application has already applied for both a Japanese patent (application No. 2009-241798) and a U.S. patent (application Ser. No. 12/837,726).

The stator 20 includes a hollow cylindrical stator core 30 and a stator coil 40. The stator core 30 has, as shown in FIG. 2, a plurality of slots 31 that are formed in the radially inner surface of the stator core 30 and spaced in the circumferential direction of the stator core 30. The stator coil 40 is comprised of a plurality of electric wires mounted on the stator core 30.

Each of the electric wires has first, second, ..., nth in-slot portions and first, second, ..., (n−1)th turn portions, where n is an integer not less than 4. The first to the nth in-slot portions are sequentially received in p of the slots 31 of the stator core 30, where p is an integer not greater than n. The first to the (n−1)th turn portions are alternately located on opposite axial sides of the stator core 30 outside the slots 31 to connect corresponding adjacent pairs of the first to the nth in-slot portions. Each of the electric wires also has first and second end portions. The first end portion is closer to the first in-slot portion than any other of the in-slot portions of the electric wire; the second end portion is closer to the nth in-slot portion than any other of the in-slot portions of the electric wire. The first in-slot portions of the electric wires are located most radially outward and the nth in-slot portions are located most radially inward in the slots 31 of the stator core 30. Moreover, the stator coil 40 is a multi-phase (e.g., three-phase) stator coil that includes a plurality of phase windings. Each of the phase windings of the stator coil 40 is formed of at least two of the electric wires. The first end portion of one of the two electric wires is connected to the second end portion of the other electric wire.

With the above configuration, since each of the phase windings of the stator coil 40 is formed of the at least two electric wires, it is possible to shorten the length of each of the electric wires. Consequently, the electric wires can be shaped using a small-scale shaping machine and be easily handled during the manufacture of the stator 20. As a result, it is possible to achieve a high productivity and a low cost of the stator.

Moreover, in the stator 20, for each connected pair of the electric wires forming the stator coil 40, the first end portion of one of the electric wires is connected to the second end portion of the other electric wire via an electrically-conductive crossover member 70. The crossover member 70 extends to cross over an annular coil end part 40A of the stator coil 40, which protrudes from a corresponding axial end face 30A of the stator core 30, from the radially inside to the radially outside of the coil end part 40A.

Furthermore, the crossover member 70 may be provided as an integral part of the second end portion of the other electric wire, as shown in FIG. 1.

Otherwise, the crossover member 70 may also be provided such that: halves of the crossover member 70 are respectively included in the first end portion of the one electric wire and the second end portion of the other electric wire; and the halves of the crossover member 70 are joined together by, for example, arc welding. However, in this case, since the welding of the halves of the crossover member 70 is performed at a position immediately above the coil end part 40A of the stator coil 40, the welding sparks may fly to reach the coil end part 40A, causing the stator coil 40 to be damaged by the heat of the welding sparks.

Furthermore, to protect the stator coil 40 from the welding sparks, one may consider configuring the crossover member 70 so as to be positioned sufficiently away from the coil end part 40A of the stator coil 40. However, in this case, the axial length of the stator coil 40 will be increased, thereby making it difficult to minimize the size of the entire stator 20.

SUMMARY

According to an embodiment, there is provided a method of manufacturing a stator for an electric rotating machine. The method includes the steps of: (a) preparing a hollow cylindrical stator core and a plurality of electric wires, the stator core having a plurality of slots that are formed in a radially inner surface of the stator core and spaced in a circumferential direction of the stator core; (b) assembling together the stator core and the electric wires; (c) welding corresponding pairs of the electric wires to form a stator coil, wherein for each corresponding pair of the electric wires, one of the electric wires has an end portion led out from a radially inner periphery of one of the slots of the stator core while the other electric wire has an end portion led out from a radially outer periphery of another one of the slots of the stator core, the end portions of the electric wires are radially bent toward each other so as to have distal end surfaces of the end portions abutting each other at a position axially outside an annular coil end part of the stator coil, the coil end part protruding from a corresponding axial end face of the stator core so as to be located outside the slots of the stator core, the distal end surfaces of the end portions of the electric wires are welded together to form a weld between the end portions, and the end portions of the electric wires together make up a crossover part that includes the weld and extends to cross over the annular coil end part of the stator coil from the radially inside to the radially outside of the coil end part; and (d) deforming, for each corresponding pair of the electric wires, the end portions of the electric wires so as to reduce an axial distance between the coil end part of the stator coil and the crossover part made up of the end portions.

With the above method, it is possible to reduce the axial length of the stator coil, thereby minimizing the size of the entire stator.

Further, in the step (c) of the method, for each corresponding pair of the electric wires, the axial distance between the coil end part of the stator coil and the crossover part is preferably kept not less than a first reference value, the first reference value being predetermined such that when the axial distance is not less than the first reference value, the stator coil can be protected from heat damage during the welding of the distal end surfaces of the end portions of the electric wires.

Furthermore, in the step (d) of the method, for each corresponding pair of the electric wires, parts of the end portions of the electric wires which respectively extend on the radially inside and outside of the annular coil end part of the stator coil may be partially protruded in the circumferential direction of the stator core so as to reduce the axial distance to become not greater than a second reference value, the second reference value being less than the first reference value.

Otherwise, in the step (d) of the method, for each corresponding pair of the electric wires, parts of the end portions of the electric wires which respectively extend on the radially inside and outside of the annular coil end part of the stator coil may be bent from the axial direction to the circumferential direction of the stator core so as to reduce the axial distance to become not greater than a third reference value, the third reference value being less than the first reference value.

It is preferable that for each corresponding pair of the electric wires, parts of the end portions of the electric wires which are deformed in the step (d) of the method have a thickness less than a predetermined thickness.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings.

DESCRIPTION OF PREFERRED EMBODIMENT

Figure 3:
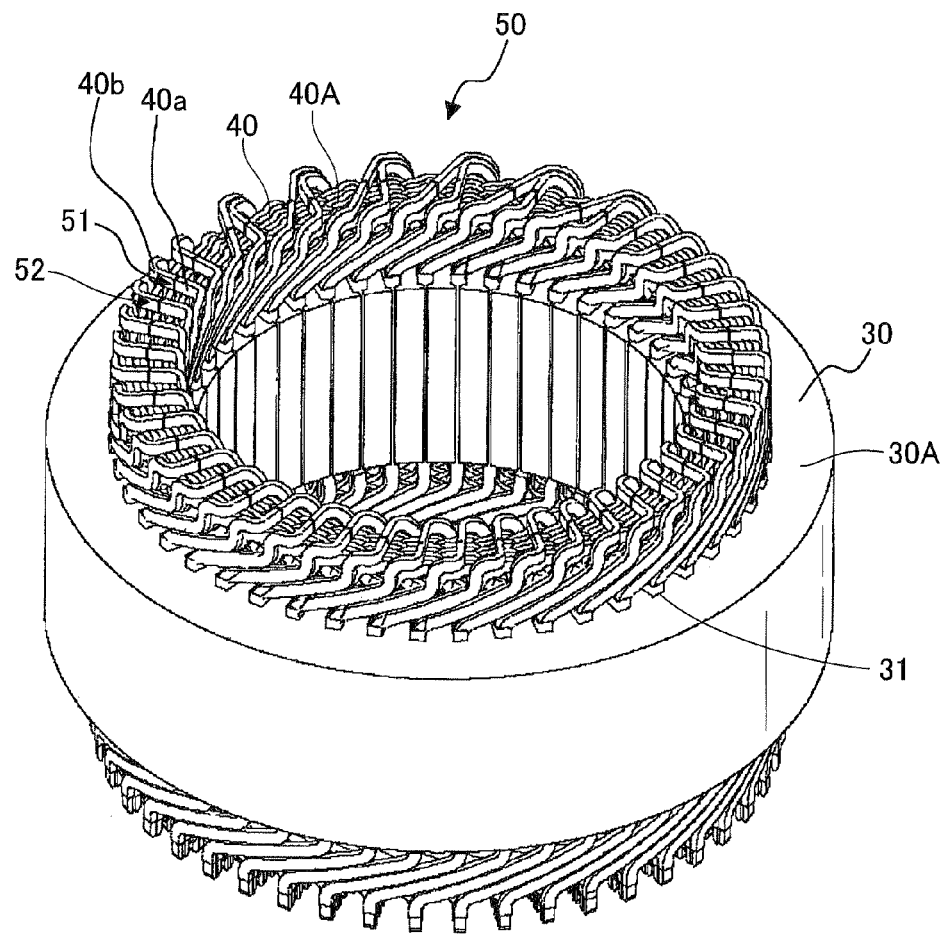
FIG. 3 is a perspective view of a stator for an electric rotating machine which is manufactured by a method according to an embodiment of the invention.

FIG. 3 shows the overall configuration of a stator 50 for an electric rotating machine, which is manufactured by a method according to an embodiment of the present invention.

As shown in FIG. 3, the stator 50 includes a hollow cylindrical stator core 30 and a stator coil 40.

Figure 1:
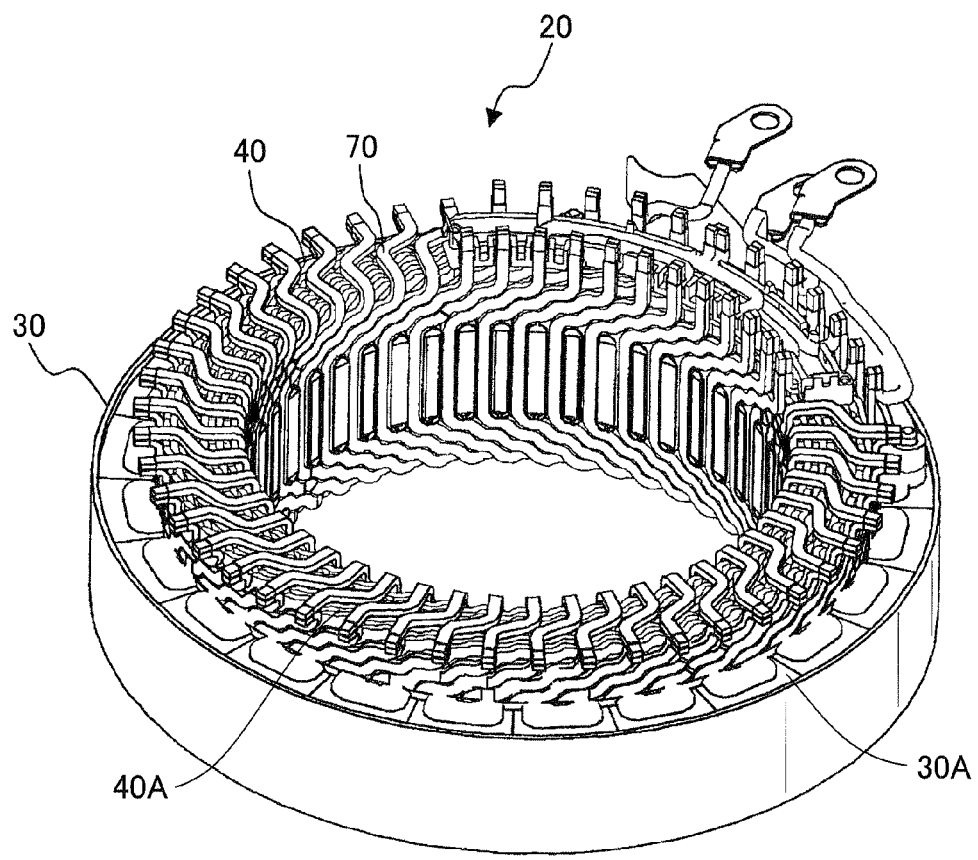
FIG. 1 is a perspective view of a stator for an electric rotating machine according to a related art.
Figure 2:
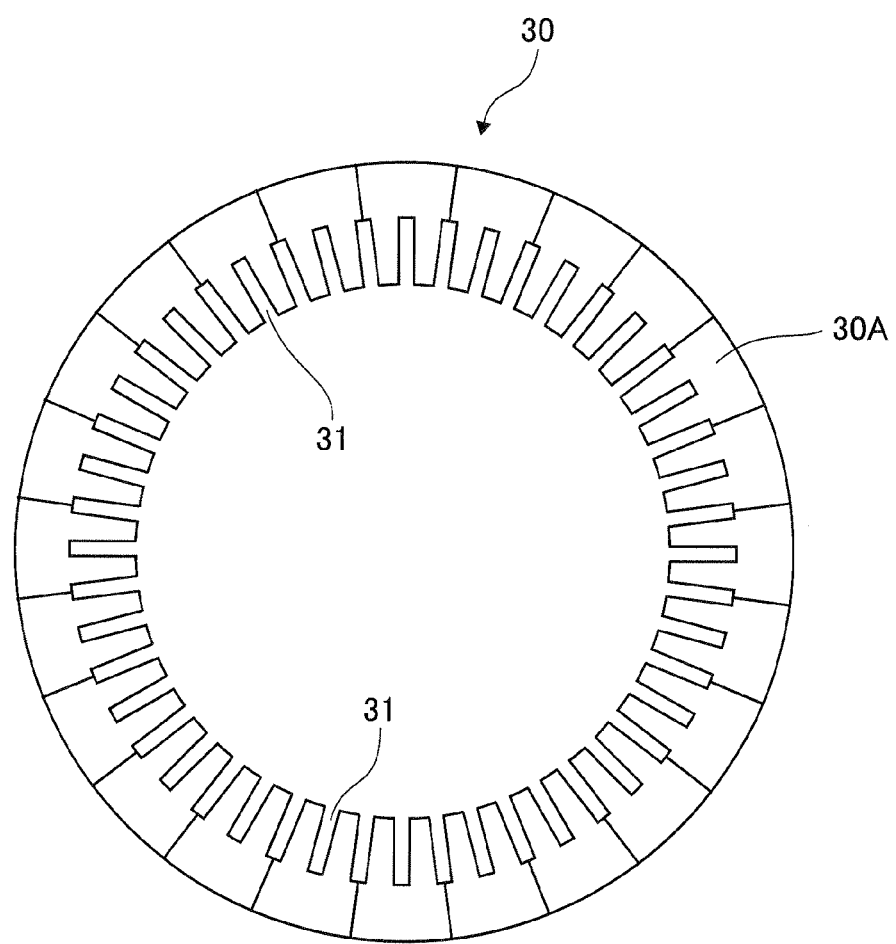
FIG. 2 is an axial end view of a stator core.

The stator core 30 is configured as shown in FIG. 2. Specifically, the stator core 30 has a plurality of slots 31 that are formed in the radially inner surface of the stator core 30 and spaced in the circumferential direction of the stator core 30.

The stator coil 40 is comprised of a plurality of electric wires mounted on the stator core 30. Further, the stator coil 40 is configured as a three-phase stator coil that includes U-phase, V-phase and W-phase windings. Each of the U-phase, V-phase and W-phase windings is formed by joining at least two of the electric wires. For each joined pair of the electric wires, one of the electric wires has an end portion 40$a$ led out from the radially inner periphery of one slot 31 of the stator core 30, while the other electric wire has an end portion 40$b$ led out from the radially outer periphery of another slot 31 of the stator core 30. The end portions 40$a$ and 40$b$ of the electric wires are radially bent toward each other so as to have distal end surfaces of the end portions 40$a$ and 40$b$ abutting each other at a position above an annular coil end part 40A of the stator coil 40; the coil end part 40A protrudes from a corresponding axial end face 30A of the stator core 30 so as to be located outside the slots 31 of the stator core 30. The distal end surfaces of the end portions 40$a$ and 40$b$ of the electric wires are welded to form a weld 51 between the end portions 40$a$ and 40$b$. In addition, the end portions 40$a$ and 40$b$ of the electric wires together make up a crossover part 52 that includes the weld 51 and extends to cross over the annular coil end part 40A of the stator coil 40 from the radially inside to the radially outside of the coil end part 40A.

Next, the method of manufacturing the stator 50 according to the present embodiment will be described. The method includes a preparing step, an assembling step, a welding step, and a deforming step.

In the preparing step, the stator core 30 and the electric wires for forming the stator coil 40 are prepared.

In the assembling step, the stator core 30 and the electric wires are assembled together.

In the welding step, corresponding pairs of the electric wires are welded to form the U-phase, V-phase and W-phase windings of the stator coil 40.

Figure 4:
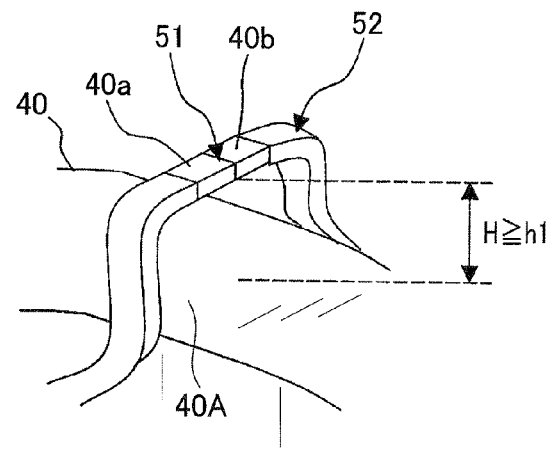
FIG. 4 is a perspective view illustrating a welding step of the method.

More specifically, in this step, for each corresponding pair of the electric wires, the end portions 40$a$ and 40$b$ of the electric wires are radially bent toward each other, thereby bringing the distal end surfaces of the end portions 40$a$ and 40$b$ in abutment with each other at a position axially outside the annular coil end part 40A of the stator coil 40. Consequently, the end portions 40$a$ and 40$b$ together make up the crossover part 52 that extends to cross over the annular coil end part 40A of the stator coil 40 from the radially inside to the radially outside of the coil end part 40A. Further, in the present embodiment, as shown in FIG. 4, the axial distance H between the coil end part 40A of the stator coil 40 and the crossover part 52 is kept not less than a first reference value h1. Here, the first reference value h1 is predetermined such that when the axial distance H is not less than the first reference value h1, it is possible to prevent the welding sparks from flying to reach the coil end part 40A, thereby preventing the stator coil 40 from being damaged by the heat of the welding sparks. Thereafter, the distal end surfaces of the end portions 40a and 40b are welded together, forming the weld 51 therebetween.

Figure 5:
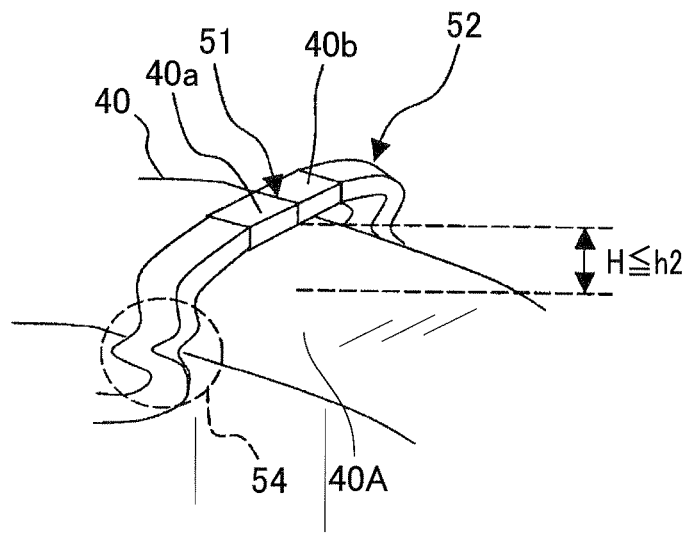
FIG. 5 is a perspective view illustrating a deforming step of the method.

In the deforming step, for each corresponding pair of the electric wires forming the stator coil 40, parts of the end portions 40a and 40b of the electric wires which respectively extend on the radially inside and outside of the annular coil end part 40A of the stator coil 40 are deformed so as to reduce the axial distance H between the coil end part 40A of the stator coil 40 and the crossover part 52 to become not greater than a second reference value h2, as shown in FIG. 5. The second reference value h2 is predetermined to be less than the first reference value h1. More specifically, as indicated with a dashed circle 54 in FIG. 5, the parts of the end portions 40a and 40b of the electric wires are partially protruded in the circumferential direction of the stator core 30 so as to reduce the axial length of the parts of the end portions 40a and 40b. In addition, the parts of the end portions 40a and 40b have a thickness less than a predetermined thickness so that they can be easily deformed to reduce the axial distance H.

As a result, the stator 50 as shown in FIG. 3 is finally obtained.

The method of manufacturing the stator 50 according to the present embodiment has the following advantages.

In the present embodiment, for each corresponding pair of the electric wires forming the stator coil 40, the distal end surfaces of the end portions 40a and 40b of the electric wires are welded with the axial distance H between the coil end part 40A of the stator coil 40 and the crossover part 52 kept not less than the first reference value h1. Consequently, during the welding of the distal end surfaces of the end portions 40a and 40b, it is possible to prevent the welding sparks from flying to reach the coil end part 40A, thereby preventing the stator coil 40 from being damaged by the heat of the welding sparks.

Moreover, after the welding of the distal end surfaces, those parts of the end portions 40a and 40b of the electric wires which respectively extend on the radially inside and outside of the annular coil end part 40A of the stator coil 40 are partially protruded in the circumferential direction of the stator core 30, thereby reducing the axial distance H to become not greater than the second reference value h2. Consequently, the axial length of the stator coil 40 can be reduced, thereby minimizing the size of the entire stator 50.

In addition, in the present embodiment, those parts of the end portions 40a and 40b which respectively extend on the radially inside and outside of the annular coil end part 40A of the stator coil 40 have a thickness less than the predetermined thickness. Consequently, those parts of the end portions 40a and 40b can be easily deformed to reduce the axial distance H.

While the above particular embodiment of the present invention has been shown and described, it will be understood by those skilled in the art that various modifications, changes, and improvements may be made without departing from the spirit of the invention.

For example, in the previous embodiment, for each corresponding pair of the electric wires forming the stator coil 40, those parts of the end portions 40a and 40b of the electric wires which respectively extend on the radially inside and outside of the annular coil end part 40A of the stator coil 40 are partially protruded in the circumferential direction of the stator core 30 so as to reduce the axial distance H.

Figure 6:
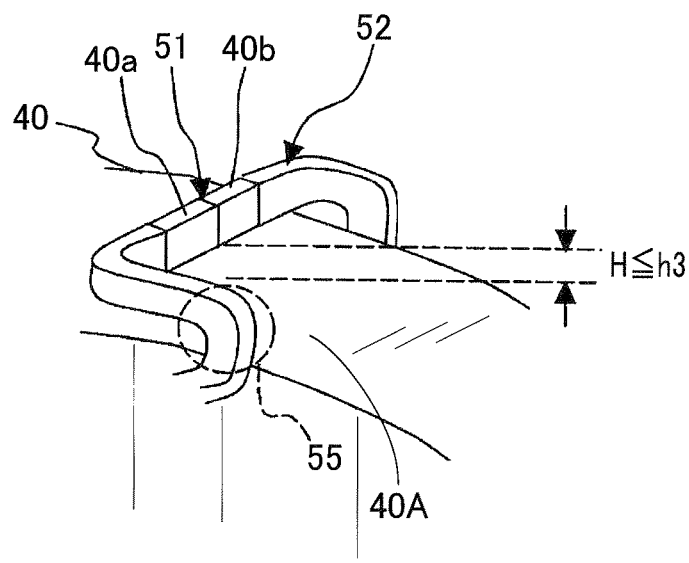
FIG. 6 is a perspective view illustrating a modification of the deforming step.

However, as indicated with a dashed circle 55 in FIG. 6, those parts of the end portions 40a and 40b of the electric wires may also be bent from the axial direction to the circumferential direction of the stator core 30 so as to reduce the axial distance H to become not greater than a third reference value h3; the third reference value h3 is predetermined less than the second reference value h2. In this case, it is possible to further reduce the axial length of the stator coil 40.

What is claimed is:

1. A method of manufacturing a stator for an electric rotating machine, the method comprising the steps of:
   (a) preparing a hollow cylindrical stator core and a plurality of electric wires, the stator core having a plurality of slots that are formed in a radially inner surface of the stator core and spaced in a circumferential direction of the stator core;
   (b) assembling together the stator core and the electric wires;
   (c) welding corresponding pairs of the electric wires to form a stator coil,
   wherein for each corresponding pair of the electric wires, one of the electric wires has an end portion led out from a radially inner periphery of one of the slots of the stator core while the other electric wire has an end portion led out from a radially outer periphery of another one of the slots of the stator core,
   the end portions of the electric wires are radially bent toward each other so as to have distal end surfaces of the end portions abutting each other at a position axially outside an annular coil end part of the stator coil, the coil end part protruding from a corresponding axial end face of the stator core so as to be located outside the slots of the stator core,
   the distal end surfaces of the end portions of the electric wires are welded together to form a weld between the end portions, and
   the end portions of the electric wires together make up a crossover part that includes the weld and extends to cross over the annular coil end part of the stator coil from the radially inside to the radially outside of the coil end part; and
   (d) deforming, for each corresponding pair of the electric wires, the end portions of the electric wires so as to reduce an axial distance between the coil end part of the stator coil and the crossover part made up of the end portions.

2. The method as set forth in claim 1, wherein in the step (c), for each corresponding pair of the electric wires, the axial distance between the coil end part of the stator coil and the crossover part is kept not less than a first reference value, the first reference value being predetermined such that when the axial distance is not less than the first reference value, the stator coil can be protected from heat damage during the welding of the distal end surfaces of the end portions of the electric wires.

3. The method as set forth in claim 2, wherein in the step (d), for each corresponding pair of the electric wires, parts of the end portions of the electric wires which respectively extend on the radially inside and outside of the annular coil end part of the stator coil are partially protruded in the circumferential direction of the stator core so as to reduce the axial distance to become not greater than a second reference value, the second reference value being less than the first reference value.

4. The method as set forth in claim 3, wherein for each corresponding pair of the electric wires, the parts of the end portions of the electric wires have a thickness less than a predetermined thickness.

5. The method as set forth in claim 2, wherein in the step (d), for each corresponding pair of the electric wires, parts of the end portions of the electric wires which respectively extend on the radially inside and outside of the annular coil end part of the stator coil are bent from the axial direction to the circumferential direction of the stator core so as to reduce the axial distance to become not greater than a third reference value, the third reference value being less than the first reference value.

6. The method as set forth in claim 5, wherein for each corresponding pair of the electric wires, the parts of the end portions of the electric wires have a thickness less than a predetermined thickness.

7. The method as set forth in claim 1, wherein in the step (d), for each corresponding pair of the electric wires, parts of the end portions of the electric wires which respectively extend on the radially inside and outside of the annular coil end part of the stator coil are partially protruded in the circumferential direction of the stator core so as to reduce the axial distance.

8. The method as set forth in claim 1, wherein in the step (d), for each corresponding pair of the electric wires, parts of the end portions of the electric wires which respectively extend on the radially inside and outside of the annular coil end part of the stator coil are bent from the axial direction to the circumferential direction of the stator core so as to reduce the axial distance.

9. The method as set forth in claim 1, wherein for each corresponding pair of the electric wires, parts of the end portions of the electric wires which are deformed in the step (d) have a thickness less than a predetermined thickness.

* * * * *